(12) United States Patent
Xu et al.

(10) Patent No.: US 10,154,292 B2
(45) Date of Patent: Dec. 11, 2018

(54) INFORMATION PUSHING METHOD AND SYSTEM, CLOUD SERVER AND INFORMATION SERVER

(71) Applicant: SHENZHEN SKYWORTH-RGB ELECTRONIC CO., LTD., Guangdong (CN)

(72) Inventors: Yaoling Xu, Guangdong (CN); Zhilong Hou, Guangdong (CN)

(73) Assignee: SHENZHEN SKYWORTH-RGB ELECTRONIC CO., LTD., Shenzhen (CN)

( * ) Notice: Subject to any disclaimer, the term of this patent is extended or adjusted under 35 U.S.C. 154(b) by 164 days.

(21) Appl. No.: 14/908,742

(22) PCT Filed: Mar. 10, 2015

(86) PCT No.: PCT/CN2015/073955
§ 371 (c)(1),
(2) Date: Jan. 29, 2016

(87) PCT Pub. No.: WO2015/135466
PCT Pub. Date: Sep. 17, 2015

(65) Prior Publication Data
US 2016/0173916 A1    Jun. 16, 2016

(30) Foreign Application Priority Data

Mar. 14, 2014 (CN) .......................... 2014 1 0096248

(51) Int. Cl.
*H04N 21/234* (2011.01)
*H04N 21/81* (2011.01)
(Continued)

(52) U.S. Cl.
CPC ....... *H04N 21/23424* (2013.01); *H04L 67/10* (2013.01); *H04L 67/26* (2013.01);
(Continued)

(58) Field of Classification Search
CPC ........... H04N 21/23424; H04N 21/812; H04N 21/4331; H04N 21/4318; H04N 21/6125;
(Continued)

(56) References Cited

U.S. PATENT DOCUMENTS 9,078,048 B1 *   7/2015   Gargi .................... H04N 21/812
2010/0115565 A1*   5/2010   Fujihira ............. H04N 7/17318
                                                                    725/91
2014/0359656 A1   12/2014   Banica et al.

FOREIGN PATENT DOCUMENTS

CN       102404642 A       4/2012
CN       102497585 A       6/2012
(Continued)

OTHER PUBLICATIONS

1st Office Action of counterpart Chinese Patent Application No. 201410096248.2 dated Aug. 2, 2016.
(Continued)

*Primary Examiner* — Oleg Asanbayev
*Assistant Examiner* — Akshay Doshi

(57) ABSTRACT

The present invention discloses an information pushing method. The method includes: a cloud server receiving program information from a program server and analyzing program content in the received program information to find available regions in image frames of the program content; the cloud server generating a block information record table for the found available regions; and an information server receiving the block information record table from the cloud server, finding corresponding information to be pushed for identifiers of the available regions in the block information record table according to a preset information association rule, associating the information to be pushed with the identifiers and sending the found information to be pushed to a corresponding playing terminal. The present invention
(Continued)

also discloses an information pushing system, a cloud server and a information server.

14 Claims, 5 Drawing Sheets

(51) Int. Cl.
| | |
|---|---|
| H04N 21/2343 | (2011.01) |
| H04N 21/433 | (2011.01) |
| H04N 21/431 | (2011.01) |
| H04N 21/61 | (2011.01) |
| H04N 21/218 | (2011.01) |
| H04N 21/84 | (2011.01) |
| H04N 21/44 | (2011.01) |
| H04N 21/4545 | (2011.01) |
| H04N 21/6543 | (2011.01) |
| H04N 21/262 | (2011.01) |
| H04L 29/08 | (2006.01) |

(52) U.S. Cl.
CPC ..... *H04N 21/2181* (2013.01); *H04N 21/2343* (2013.01); *H04N 21/262* (2013.01); *H04N 21/4318* (2013.01); *H04N 21/4331* (2013.01); *H04N 21/44008* (2013.01); *H04N 21/45455* (2013.01); *H04N 21/6125* (2013.01); *H04N 21/6543* (2013.01); *H04N 21/812* (2013.01); *H04N 21/84* (2013.01)

(58) Field of Classification Search
CPC ............... H04N 21/2181; H04N 21/84; H04N 21/44008; H04N 21/45455; H04N 21/6543; H04N 21/262; H04L 67/10; H04L 67/26
See application file for complete search history.

(56) References Cited

FOREIGN PATENT DOCUMENTS

| | | |
|---|---|---|
| CN | 103024563 A | 4/2013 |
| JP | 2006014200 A | 1/2006 |

OTHER PUBLICATIONS

International Search Report of PCT Patent Application No. PCT/CN2015/073955 dated Jun. 10, 2015.

* cited by examiner

INFORMATION PUSHING METHOD AND SYSTEM, CLOUD SERVER AND INFORMATION SERVER

BACKGROUND

Technical Field

The present invention relates to the field of communications technologies, and in particular, to an information pushing method and system, a cloud server and an information server.

Related Art

With the development of smart televisions, people can watch a variety of television programs by using a smart television. When a smart television is playing a normal program, information such as an advertisement is usually inserted. For example, information such as an advertisement is inserted before or after a program is played or in the middle of a program being played, or is inserted at a specific time. However, such an information insertion manner has the following defects: playing time of a program is occupied. In view of the defect, a solution is proposed in the prior art: Information to be inserted and program content are mixed and encoded and are used as one program source for playing; however, the solution has the following defects: after the information to be inserted and the program content are mixed and encoded, the information to be inserted is fixed and cannot be changed easily, and therefore a requirement of flexible insertion of the information to be inserted cannot be satisfied.

The foregoing content is merely used to help to understand technical solutions of the present invention, and it is not represented that the foregoing content is acknowledged as the prior art.

SUMMARY

A main objective of the present invention is to provide an information pushing method, so that programs and information pushed by an information server can be played by a playing terminal at the same time, playing time of the programs is not affected, diversified information can be provided for users, and user experience is improved.

To achieve the foregoing objective, the present invention provides an information pushing method, including:

a cloud server receiving program information from a program server and analyzing program content in the received program information to find available regions in image frames of the program content;

the cloud server generating a block information record table for the found available regions, the block information record table including program numbers, identifiers of the available regions, locations and shapes of the available regions, and durations of identical available regions in the program content; and an information server receiving the block information record table from the cloud server, finding corresponding information to be pushed for the identifiers of the available regions in the block information record table according to a preset information association rule, associating the information to be pushed with the identifiers and sending the found information to be pushed to a corresponding playing terminal, so as to insert, in the available regions in the image frames of the program content played by the playing terminal, the corresponding information to be pushed.

The present invention further provides an information pushing system, the system including: a program server, a cloud server and a playing terminal separately connected to the program server and an information server connected to the cloud server, the information server being connected to the playing terminal, where the cloud server includes:

a first transceiver module, configured to receive program information from the program server; and a first generation module, configured to analyze program content in the received program information to find available regions in image frames of the program content, and generate a block information record table for the found available regions, the block information record table including program numbers, identifiers of the available regions, locations and shapes of the available regions, and durations of identical available regions in the program content; and the information server includes:

a second transceiver module, configured to receive the block information record table from the cloud server; and a second generation module, configured to find corresponding information to be pushed for the identifiers of the available regions in the block information record table according to a preset information association rule, and associate the information to be pushed with the identifiers, where the second transceiver module is further configured to send the found information to be pushed to a corresponding playing terminal, so as to insert, in the available regions in the image frames of the program content played by the playing terminal, the corresponding information to be pushed.

The present invention further provides a cloud server applied to the information pushing method according to any one of the foregoing, the cloud server including:

a first transceiver module, configured to receive program information from a program server; and a first generation module, configured to analyze program content in the received program information to find available regions in image frames of the program content, and generate a block information record table for the found available regions, the block information record table including program numbers, identifiers of the available regions, locations and shapes of the available regions, and durations of identical available regions in the program content.

The present invention further provides an information server applied to the information pushing method according to any one of the foregoing, the information server including:

a second transceiver module, configured to receive a block information record table from a cloud server; and a second generation module, configured to find corresponding information to be pushed for identifiers of available regions in the block information record table according to a preset information association rule, and associate the information to be pushed with the identifiers, where the second transceiver module is further configured to send the found information to be pushed to a corresponding playing terminal, so as to insert, in the available regions in image frames of a program content played by the playing terminal, the corresponding information to be pushed.

By means of the present invention, a cloud server receives program information from a program server and analyzes program content in the received program information, finds available regions from the program content and generates a block information record table; an information server finds corresponding information to be pushed for identifiers of the available regions in the block information record table according to a preset information association rule, associates the information to be pushed with the identifiers and sends the found information to be pushed to a corresponding playing terminal, so as to insert, in the available regions in image frames of the program content played by the playing terminal, the corresponding information to be pushed. The information server can provide diversified information for the available regions of the program content, playing time of the programs is not affected, diversified information can be provided for users, and user experience is improved.

The implementation of objectives, the functional characteristics, and the advantages of the present invention are further described with reference to the embodiments and the accompanying drawings.

DETAILED DESCRIPTION

It should be understood that the specific embodiments described herein are merely used to explain the present invention, and are not used to limit the present invention.

Figure 1:
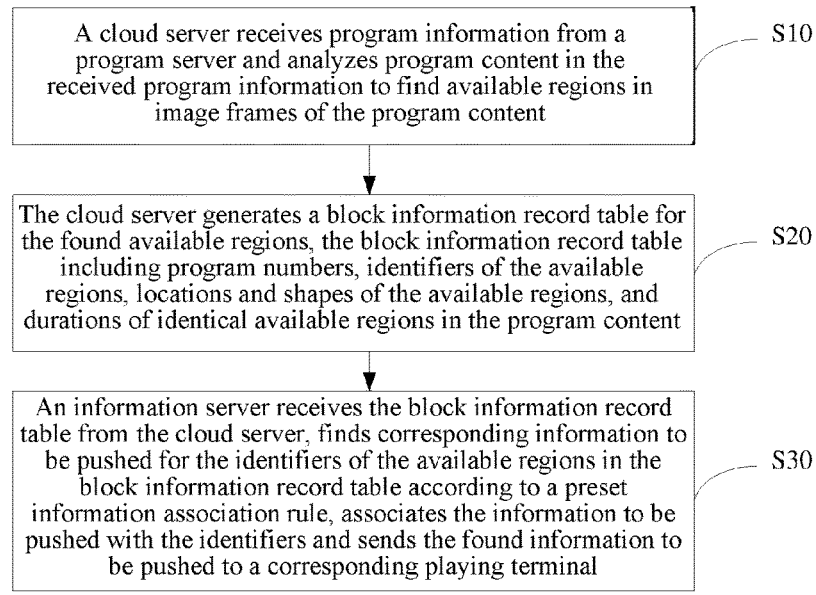
FIG. 1 is a schematic flowchart of a first embodiment of an information pushing method according to the present invention.

Referring to FIG. 1, an information pushing method includes:

S10: A cloud server receives program information from a program server and analyzes program content in the received program information to find available regions in image frames of the program content.

The cloud server may receive the program information from the program server by using the Internet, or may receive the program information from the program server in another wireless communication manner. The program server may provide multiple pieces of program information, the program information including a program number and the program content, for example, the program number being P1, and the program content being News Simulcast, and the program number being P2, and the program content being Focus Report, and the like. The program content is a video file.

In step S10, the cloud server receives the program information, and finds the available regions in the image frames of the program content in the program information, where the available regions are regions that can be used to insert information.

Figure 2:
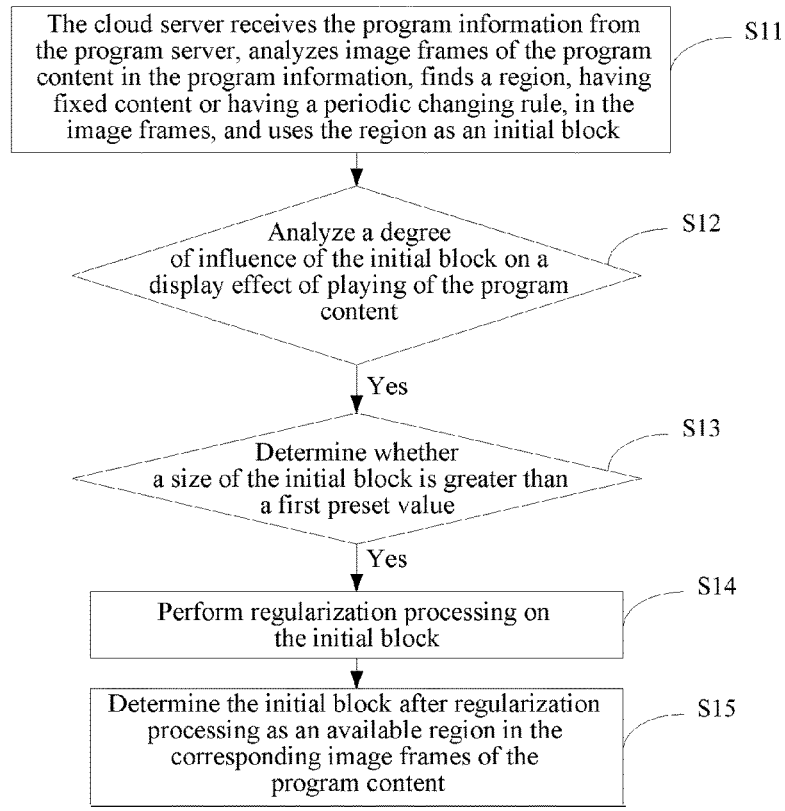
FIG. 2 is a schematic flowchart of a first embodiment of step S10 in FIG. 1.

In an embodiment, step S10 includes (as shown in FIG. 2):

S11: The cloud server receives the program information from the program server, analyzes image frames of the program content in the program information, finds a region, having fixed content or having a periodic changing rule, in the image frames, and uses the region as an initial block.

The image frames of the program content in the program information are analyzed. For example, the image frames of the program content are recognized by using an image recognition and segmentation method (for example, a K-mean cluster classification algorithm), to find a region (for example, a region 1, in which content in a first image frame is identical with content in a second image frame, where it is regarded that the content in the region 1 is fixed in the first image frame and the second image frame, for example, in a video file, some fixed scenes), having fixed content or having a periodic changing rule, in the image frames, where such a region is used as an initial block. There may be one or more initial blocks. For example, after image frames of program content whose program number is P1 are analyzed, seven initial blocks A, B, C, D, E, F, and G exist in pictures of the image frames.

S12: Analyze a degree of influence of the initial block on a display effect of playing of the program content. If the degree of the influence of the initial block on the display effect of playing of the program content is no influence or slight influence, perform step S13.

In step S12, the degree of the influence of the initial block on the display effect of playing of the program content is analyzed. Specifically, the degree of the influence of the initial block on the display effect of playing of the program content may be analyzed by using an association degree analysis method. If the influence of the initial block on the display effect of playing of the program content is obvious, it is regarded that the initial block is an invalid block, and information cannot be inserted in the initial block. For example, after seven initial blocks A, B, C, D, E, F, and G are analyzed, it is found that influence of the initial block B on the display effect of playing of the program content is obvious, so that the initial block B is discarded; and it is found that the degrees of influence of the initial blocks A, C, D, E, F, and G on the display effect of playing of the program content are no influence or slight influence, the initial blocks A, C, D, E, F, and G are kept to continue to perform processing.

S13: Determine whether a size of the initial block is greater than a first preset value, and if the size of the initial block is greater than the first preset value, perform step S14.

The first preset value may be set according to an actual requirement, for example, may be set to 2 square centimeters. In step S13, the size of the initial block is determined, so as to determine whether the size of the initial block is greater than the first preset value. If the size of the initial block is greater than the first preset value, it is preliminarily regarded that the size of the initial block is sufficient for insertion of information. If the size of the initial block is less than or equal to the first preset value, it may be regarded that the size of the initial block is too small and is insufficient for insertion of information, and the initial block is an invalid block. For example, after sizes of the initial blocks A, C, D, E, F, and G after step S12 are analyzed, it is found that a size of the initial block E is less than or equal to the first preset value, and the initial block E is discarded; and it is found that sizes of the initial blocks A, C, D, F, and G are greater than the first preset value, the initial blocks A, C, D, F, and G are kept to continue to perform processing.

S14: Perform regularization processing on the initial block.

In step S14, regularization processing is performed on the initial block. Because a shape of the initial block determined in step S11 is usually irregular (for example, the initial block may have many protruding corners), an effect of inserting information in the initial block is undesirable, and therefore regularization processing needs to be performed on the initial block. For example, the shape of the initial block is processed into a rectangular shape, an elliptical shape or a square shape, or the shape of the initial block may be processed into a regular shape such as a circular shape that is easy to watch. During specific implementation, the shape is processed into an optimal regular shape according to an original shape of the initial block. For example, when the original shape of the initial block is close to a rectangular shape, the shape of the initial block is processed into a rectangular shape.

S15: Determine the initial block after regularization processing as an available region in the corresponding image frames of the program content.

Figure 3:
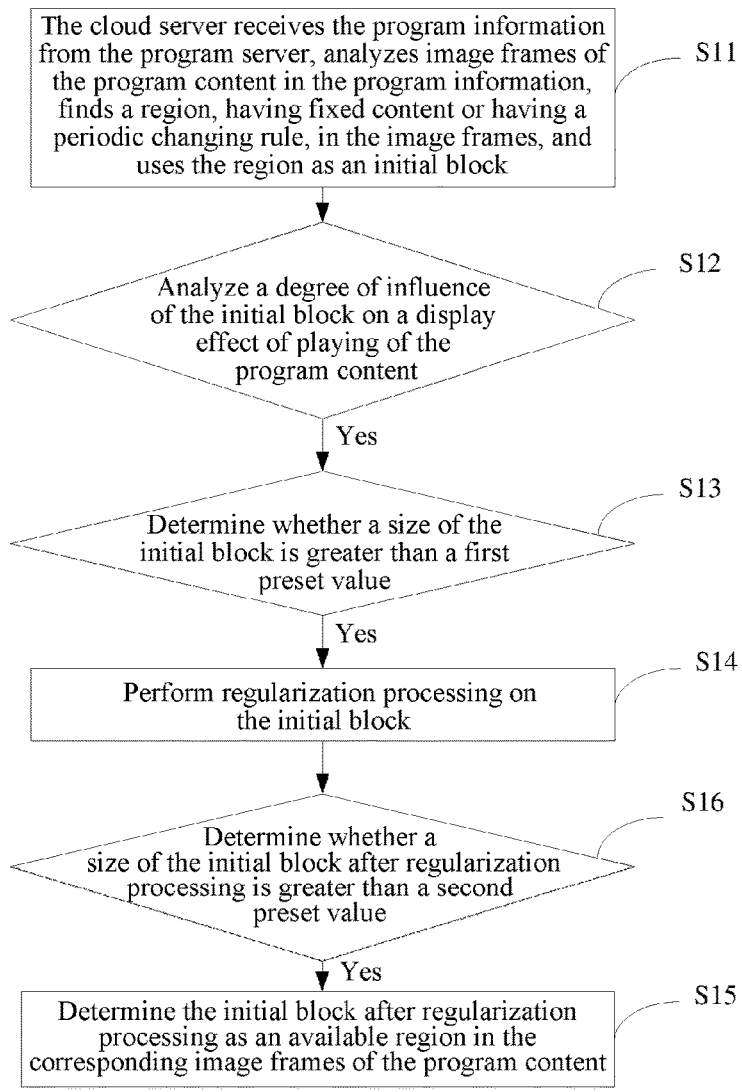
FIG. 3 is a schematic flowchart of a second embodiment of step S10 in FIG. 1.

In another embodiment, after step S14, and before step S15, step S10 further includes (as shown in FIG. 3):

S16: Determine whether a size of the initial block after regularization processing is greater than a second preset value, and if the size of the initial block after regularization processing is greater than the second preset value, perform step S15.

The second preset value may be set according to an actual requirement, for example, may be set to 3 square centimeters. In step S16, the size of the initial block after regularization processing is determined, so as to determine whether the size of the initial block after regularization processing is greater than the second preset value. If the size of the initial block after regularization processing is greater than the second preset value, it is regarded that the size of the initial block after regularization processing is sufficient for insertion of information. If the size of the initial block after regularization processing is less than or equal to the second preset value, it may be regarded that the size of the initial block after regularization processing is too small and is insufficient for insertion of information, and the initial block after regularization processing is regarded as an invalid block, that is, it may be regarded that the initial block is an invalid block. For example, after the initial blocks A, C, D, F, and G after regularization processing in step S14 are analyzed, it is found that a size of the initial block C is less than or equal to the second preset value, the initial block C is discarded; and it is found that sizes of the initial blocks A, D, F, and G are greater than the second preset value, the initial blocks A, D, F, and G are kept to continue to perform processing.

Figure 4:
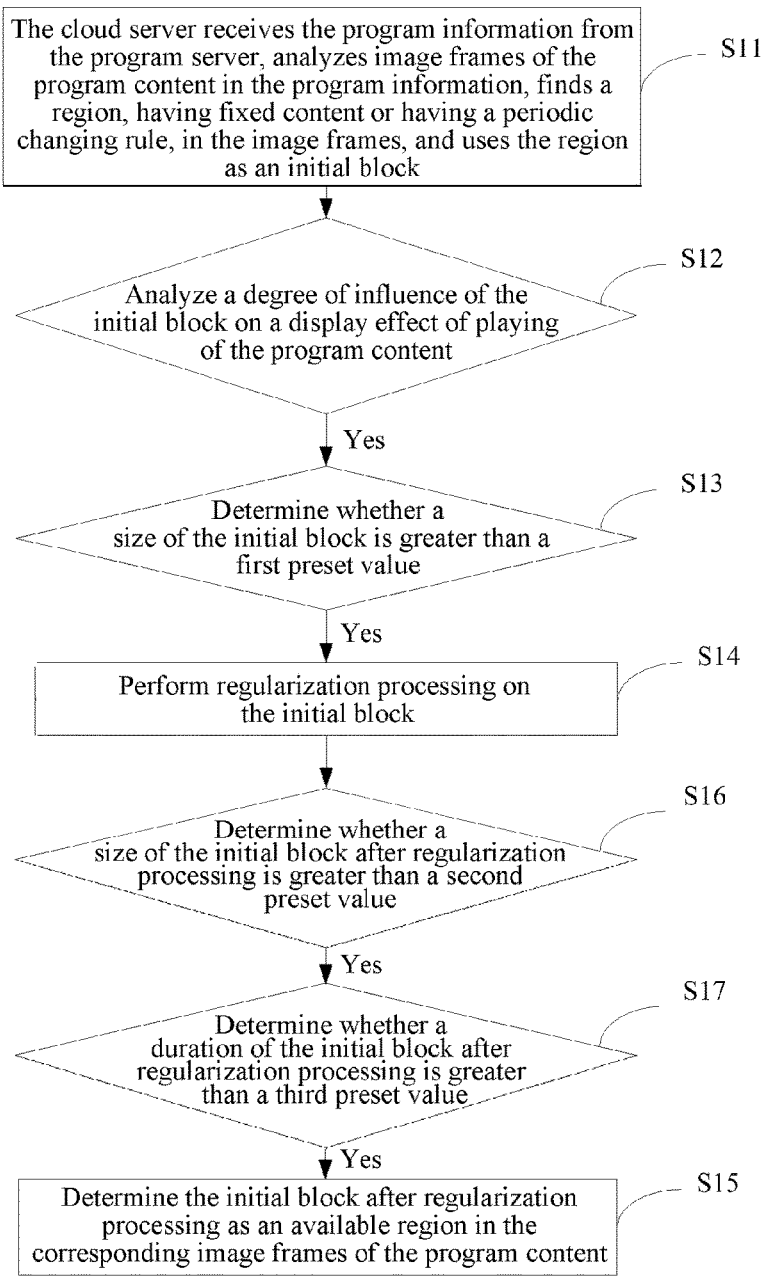
FIG. 4 is a schematic flowchart of a third embodiment of step S10 in FIG. 1.

In another embodiment, after step S16, and before step S15, step S10 further includes (as shown in FIG. 4):

S17: Determine whether a duration of the initial block after regularization processing is greater than a third preset value, and if the duration of the initial block after regularization processing is greater than the third preset value, perform step S15.

The third preset value may be set according to an actual requirement, for example, may be set to 10 seconds. In step S17, the duration of the initial block after regularization processing is determined, so as to determine whether the duration of the initial block after regularization processing is greater than the third preset value. If the duration of the initial block after regularization processing is greater than the third preset value, it may be regarded that the duration of the initial block after regularization processing is sufficient for insertion of information. If the duration of the initial block after regularization processing is less than or equal to the third preset value, it may be regarded that the duration of the initial block after regularization processing is too small and is insufficient for insertion of information, and the initial block after regularization processing is an invalid block, that is, it is regarded that the initial block is an invalid block. For example, after the initial blocks A, D, F, and G after step S16 are analyzed, it is found that the duration of the initial block G is less than or equal to the third preset value, the initial block G is discarded; and it is found that durations of the initial blocks A, D, and F are greater than the third preset value, the initial blocks A, D, and F are kept to continue to perform processing.

S20: The cloud server generates a block information record table for the found available regions, the block information record table including program numbers, identifiers of the available regions, locations and shapes of the available regions, and durations of identical available regions in the program content.

In step S20, the block information record table is generated according to the available regions, the block information record table including the program numbers, the identifiers of the available regions, the locations and shapes of the available regions, and the durations of the identical available regions in the program content. The block information record table is shown in Table 1:

TABLE 1

| Program number | Identifier of an available region | Location and shape of the available region | Duration of an identical available region in the program content |
|---|---|---|---|
| P1 | V1_B1 | V1_P1 | V1_T1 |
|    | V1_B2 | V1_P2 | V1_T |
|    | . . . | . . . | . . . |
|    | V1_Bx | V1_Px | V1_Tx |
| P2 | V2_B1 | V2_P1 | V2_T1 |
|    | V2_B2 | V2_P2 | V2_T2 |
|    | . . . | . . . | . . . |
|    | V2_By | V2_Py | V2_Ty |
| . . . | . . . | . . . | . . . |
|    | . . . | . . . | . . . |
|    | . . . | . . . | . . . |
| Pn | Vn_B1 | Vn_P1 | Vn_T1 |
|    | Vn_B2 | Vn_P2 | Vn_T2 |
|    | . . . | . . . | . . . |
|    | Vn_Bz | Vn_Pz | Vn_Tz |

S30: An information server receives the block information record table from the cloud server, finds corresponding information to be pushed for the identifiers of the available regions in the block information record table according to a preset information association rule, associates the information to be pushed with the identifiers and sends the found information to be pushed to a corresponding playing terminal, so as to insert, in the available regions in the image frames of the program content played by the playing terminal, the corresponding information to be pushed.

The information server may receive the block information record table from the cloud server by using the Internet, or may receive the block information record table from the cloud server in another wireless communication manner. The information to be pushed may be advertisement information, news information, and the like, for example, may be weather information, and emergency alarm information.

Figure 5:
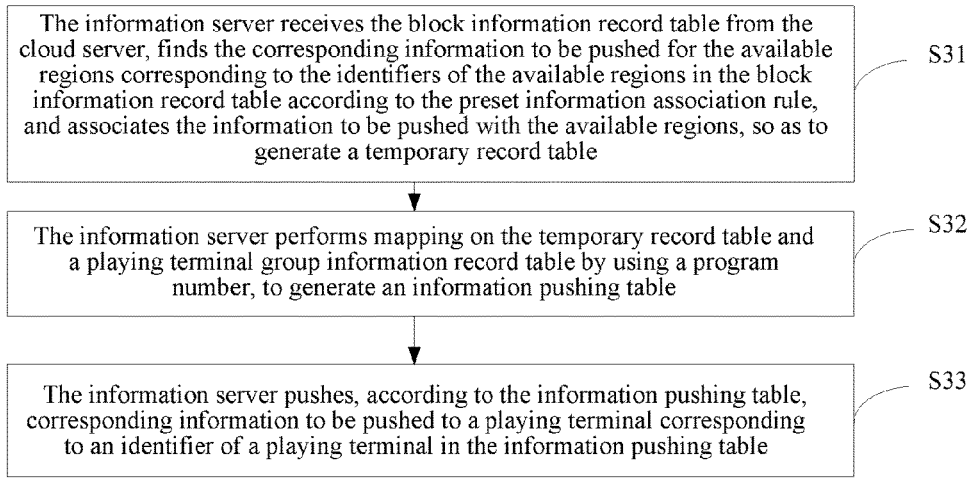
FIG. 5 is a detailed schematic flowchart of step S30 in FIG. 1.

During specific implementation, step S30 includes (as shown in FIG. 5):

S31: The information server receives the block information record table from the cloud server, finds the corresponding information to be pushed for the available regions corresponding to the identifiers of the available regions in the block information record table according to the preset information association rule, and associates the information to be pushed with the available regions, so as to generate a temporary record table, where the temporary record table includes the program numbers, the identifiers of the available regions, the locations and shapes of the available regions, the durations of the identical available regions in the program content, and the corresponding information to be pushed for the identifiers of the available regions.

In step S31, the information server finds corresponding information to be pushed for the identifiers of the available regions in the block information record table according to the preset information association rule, and associates the information to be pushed with the identifiers, where the preset information association rule may be: the corresponding information to be pushed is found for the identifiers of the available regions in the block information record table according to a mapping between locations and shapes of available regions and information to be pushed; or the preset information association rule may be: the corresponding information to be pushed is found for the identifiers of the available regions in the block information record table according to a mapping among locations and shapes of the available regions, durations of identical available regions in the program content, and information to be pushed; or the preset information association rule may be: the corresponding information to be pushed is found for the identifiers of the available regions in the block information record table according to a mapping among program numbers, locations and shapes of the available regions, durations of identical available regions in the program content, and information to be pushed. The temporary record table is shown in Table 2:

TABLE 2

| Program number | Identifier of an available region | Location and shape of the available region | Duration of an identical available region in program content | Information to be pushed |
|---|---|---|---|---|
| P1 | V1_B1 | V1_P1 | V1_T1 | V1_A1 |
|  | V1_B3 | V1_P3 | V1_T3 | V1_A3 |
|  | ... | ... | ... | ... |
|  | V1_Bx | V1_Px | V1_Tx | V1_Ax |
| P2 | V2_B2 | V2_P2 | V2_T2 | V2_A2 |
|  | ... | ... | ... | ... |
|  | V2_By | V2_Py | V2_Ty | V2_Ay |
| ... | ... | ... | ... | ... |
|  | ... | ... | ... | ... |
|  | ... | ... | ... | ... |
| Pn | Vn_B1 | Vn_P1 | Vn_T1 | Vn_A1 |
|  | Vn_B2 | Vn_P2 | Vn_T2 | Vn_A2 |
|  | ... | ... | ... | ... |
|  | Vn_Bz | Vn_Pz | Vn_Tz | Vn_Az |

It may be seen from the temporary record table that in step S31, information to be pushed V1_A1, V1_A3, and V1_Ax is respectively found for identifiers V1_B1, V1_B3, and V1_Bx of available regions whose program number is P1, an identifier V1_B2 of an available region is not in the temporary record table, and it indicates that in step S31, corresponding information to be pushed is not found for the identifier V1_B2 of the available region; in step S31, information to be pushed V2_A2 and V2_Ay are respectively found for identifiers V2_B2 and V1_Bx of available regions whose program number is P2, an identifier V2_B1 of an available region is not in the temporary record table, and it indicates that in step S31, corresponding information to be pushed is not found for the identifier V2_B1 of the available region; and the like. When in step S31, corresponding information to be pushed is found for all identifiers of available regions of a program number in the block information record table, the identifiers of the available regions corresponding to the program number in the temporary record table are identical with the identifiers of the available regions corresponding to the program number in the block information record table. When in step S31, corresponding information to be pushed is found for some identifiers of available regions of a program number in the block information record table, identifiers of available regions corresponding to the program number in the temporary record table are some of the identifiers of the available regions corresponding to the program number in the block information record table.

S32: The information server performs mapping on the temporary record table and a playing terminal group information record table by using a program number, to generate an information pushing table, the playing terminal group information record table including a program number, an identifier of a playing terminal group, and an identifier of a playing terminal.

The playing terminal group information record table is shown in Table 3.

TABLE 3

| Program number | Identifier of a playing terminal group | Identifier of a playing terminal |
|---|---|---|
| P1 | TU1 | TV11 |
|  |  | TV12 |
|  |  | ... |
| P2 | TU2 | TV21 |
|  |  | TV22 |
|  |  | ... |
| ... | ... | ... |
|  |  | ... |
|  |  | ... |
| Pn | TUn | TVn1 |
|  |  | TVn2 |
|  |  | ... |

In the step, the information server performs mapping on the temporary record table and the playing terminal group information record table by using a program number, to generate the information pushing table, where the information pushing table is shown in Table 4.

TABLE 4

| Program number | Identifier of an available region | Location and shape of the available region | Duration of an identical available region in program content | Information to be pushed | Identifier of a playing terminal group | Identifier of a playing terminal |
| --- | --- | --- | --- | --- | --- | --- |
| P1 | V1_B1 | V1_P1 | V1_T1 | V1_A1 | TU1 | TV11 |
|  | V1_B3 | V1_P3 | V1_T3 | V1_A3 |  | TV12 |
|  | ... | ... | ... | ... |  | ... |
|  | V1_Bx | V1_Px | V1_Tx | V1_Ax |  |  |
| P2 | V2_B2 | V2_P2 | V2_T2 | V2_A2 | TU2 | TV21 |
|  | ... | ... | ... | ... |  | ... |
|  | V2_By | V2_Py | V2_Ty | V2_Ay |  |  |
| ... | ... | ... | ... | ... | ... | ... |
|  | ... | ... | ... | ... |  | ... |
|  | ... | ... | ... | ... |  | ... |
|  | ... | ... | ... | ... |  | ... |
| Pn | Vn_B1 | Vn_P1 | Vn_T1 | Vn_A1 | TUn | TVn1 |
|  | Vn_B2 | Vn_P2 | Vn_T2 | Vn_A2 |  | TVn2 |
|  | ... | ... | ... | ... |  | ... |
|  | Vn_Bz | Vn_Pz | Vn_Tz | Vn_Az |  |  |

S33: The information server pushes, according to the information pushing table, corresponding information to be pushed to a playing terminal corresponding to an identifier of a playing terminal in the information pushing table, so as to insert, in the available regions in the image frames of the program content played by the corresponding playing terminal, the corresponding information to be pushed.

In step S33, the information server pushes, according to the information pushing table, corresponding information to be pushed to a playing terminal corresponding to an identifier of a playing terminal in the information pushing table. For example, the information server pushes the information to be pushed V1_A1, V1_A3, . . . , and V1_Ax to corresponding playing terminals of the identifiers of the playing terminals being TV11 and TV12, so that the corresponding playing terminals of the identifiers of the playing terminals being TV11 and TV12 insert, in the available regions in the image frames of the played program content whose program number is P1, the corresponding information to be pushed.

Figure 6:
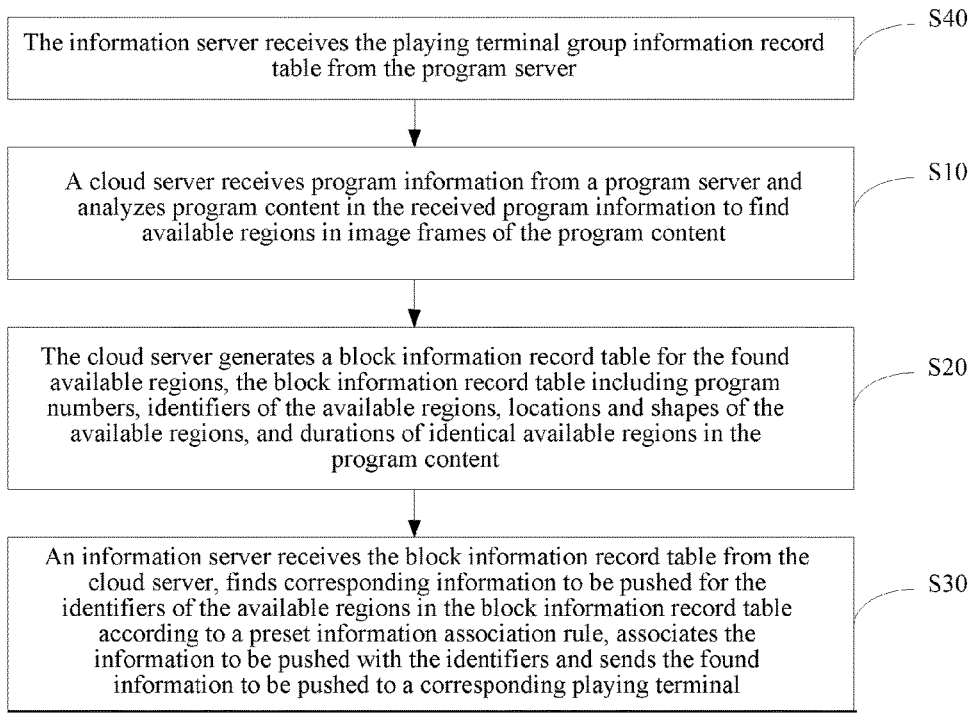
FIG. 6 is a schematic flowchart of a second embodiment of an information pushing method according to the present invention.

Referring to FIG. 6, based on the first embodiment of the foregoing information pushing method, before step S10, the method further includes:

S40: The information server receives the playing terminal group information record table from the program server.

The information server may receive the playing terminal group information record table from the program server by using the Internet, or may receive the playing terminal group information record table from the program server in another wireless communication manner.

The program server sends the program information to a playing terminal, acquires an identifier of the playing terminal returned by the playing terminal, marks playing terminals that can play same program content into one playing terminal group, and generates the playing terminal group information record table. The program information includes a program number and the program content.

Figure 7:
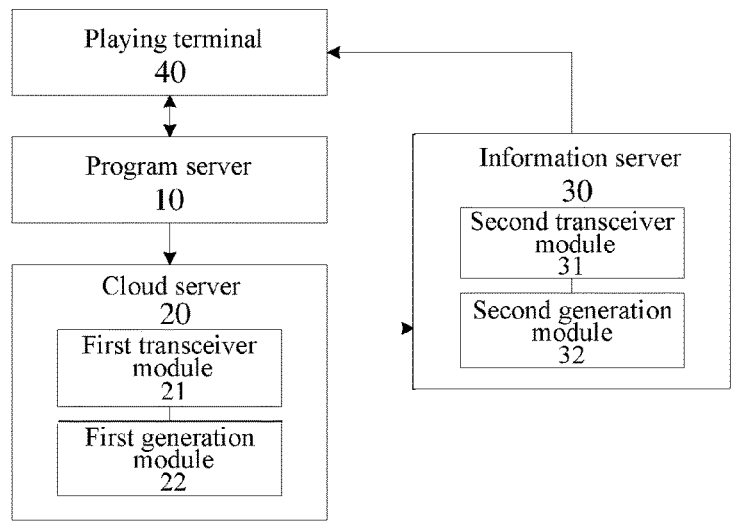
FIG. 7 is a schematic structural diagram of a preferred embodiment of an information pushing system according to the present invention.

Referring to FIG. 7, an information pushing system includes: a program server 10, a cloud server 20 and a playing terminal 40 separately connected to the program server 10, and an information server 30 connected to the cloud server 20, the information server 30 being connected to the playing terminal 40. There may be multiple playing terminals 40.

The cloud server 20 includes:

a first transceiver module 21, configured to receive program information from the program server 10; and a first generation module 22, configured to analyze program content in the received program information to find available regions in image frames of the program content, and generate a block information record table for the found available regions, as shown Table 1, the block information record table including program numbers, identifiers of the available regions, locations and shapes of the available regions, and durations of identical available regions in the program content; and the information server 30 includes:

a second transceiver module 31, configured to receive the block information record table from the cloud server 20; and a second generation module 32, configured to find corresponding information to be pushed for the identifiers of the available regions in the block information record table according to a preset information association rule, and associate the information to be pushed with the identifiers, where the second transceiver module 31 is further configured to send the found information to be pushed to a corresponding playing terminal, so as to insert, in the available regions in the image frames of the program content played by the playing terminal, the corresponding information to be pushed.

The first transceiver module 21 of the cloud server 20 may receive the program information from the program server 10 by using the Internet, or may receive the program information from the program server 10 in another wireless communication manner.

The program server 10 may provide multiple pieces of program information, the program information including a program number and the program content, for example, the program number being P1, and the program content being News Simulcast, and the program number being P2, and the program content being Focus Report, and the like. The program content is a video file.

The first generation module 22 of the cloud server 20 finds the available regions in the image frames of the program content in the received program information, where the available regions are regions that can be used to insert information.

In an embodiment, the first generation module 22 includes a first analysis unit, a second analysis unit connected to the first analysis unit, a first judging unit connected to the second analysis unit, a regularization processing unit connected to the first judging unit, a determining unit connected to the regularization processing unit, and a third generation unit connected to the determining unit.

The first analysis unit is configured to analyze the image frames of the program content in the program information, find a region, having fixed content or having a periodic changing rule, in the image frames, and use the region as an initial block. Please refer to the embodiment of the foregoing step S11 for details.

The second analysis unit is configured to analyze a degree of influence of the initial block on a display effect of playing of the program content. Please refer to the embodiment of the foregoing step S12 for details.

The first judging unit is configured to: when the degree of the influence of the initial block on the display effect of playing of the program content is no influence or slight influence, determine whether a size of the initial block is greater than a first preset value. Please refer to the embodiment of the foregoing step S13 for details.

The regularization processing unit is configured to: when the size of the initial block is greater than the first preset value, perform regularization processing on a shape of the initial block. Please refer to the embodiment of the foregoing step S14 for details.

The determining unit is configured to determine the initial block after regularization processing as an available region in the corresponding image frames of the program content.

The third generation unit is configured to generate the block information record table according to the available regions, the block information record table including the program numbers, the identifiers of the available regions, locations and shapes of the available regions, and durations of identical available regions in the program content.

In another embodiment, the first generation module 22 further includes a second judging unit, the second judging unit being separately connected to the regularization processing unit and the determining unit. The second judging unit is configured to determine whether a size of the initial block after regularization processing is greater than a second preset value. Please refer to the embodiment of the foregoing step S16 for details.

In another embodiment, the first generation module 22 further includes a third judging unit, the third judging unit being separately connected to the second judging unit and the determining unit. The third judging unit is configured to determine whether a duration of the initial block after regularization processing is greater than a third preset value. The determining unit is further configured to: when the duration of the initial block after regularization processing is greater than the third preset value, determine the initial block after regularization processing as the available region in the corresponding image frames of the program content. Please refer to the embodiment of the foregoing step S17 for details.

The second transceiver module 31 of the information server 30 may receive the block information record table from the cloud server 20 by using the Internet, or may receive the block information record table from the cloud server 20 in another wireless communication manner. The information to be pushed may be advertisement information, news information, and the like, for example, may be weather information, and emergency alarm information.

In an embodiment, the second generation module 32 includes: a first generation unit and a second generation unit, where the first generation unit is configured to find the corresponding information to be pushed for the available regions corresponding to the identifiers of the available regions in the block information record table according to the preset information association rule, and associate the information to be pushed with the available regions, so as to generate a temporary record table, the temporary record table including the program numbers, the identifiers of the available regions, the locations and shapes of the available regions, the durations of the identical available regions in the program content, and the corresponding information to be pushed for the identifiers of the available regions.

The second generation unit is configured to perform mapping on the temporary record table and a playing terminal group information record table by using a program number, so as to generate an information pushing table, the playing terminal group information record table including a program number, an identifier of a playing terminal group, and an identifier of a playing terminal.

The second transceiver module is further configured to push, according to the information pushing table, corresponding information to be pushed to a playing terminal corresponding to an identifier of a playing terminal in the information pushing table, so as to insert, in the available regions in the image frames of the program content played by the corresponding playing terminal, the corresponding information to be pushed.

The first generation unit finds corresponding information to be pushed for the identifiers of the available regions in the block information record table according to the preset information association rule, and associates the information to be pushed with the identifiers, where the preset information association rule may be: the corresponding information to be pushed is found for the identifiers of the available regions in the block information record table according to a mapping between locations and shapes of available regions and information to be pushed; or the preset information association rule may be: the corresponding information to be pushed is found for the identifiers of the available regions in the block information record table according to a mapping among locations and shapes of the available regions, durations of identical available regions in the program content, and information to be pushed; or the preset information association rule may be: the corresponding information to be pushed is found for the identifiers of the available regions in the block information record table according to a mapping among program numbers, locations and shapes of the available regions, durations of identical available regions in the program content, and information to be pushed.

The temporary record table is shown in the foregoing Table 2. The playing terminal group information record table is shown in the foregoing Table 3. The information pushing table is shown in the foregoing Table 4.

The second transceiver module pushes, according to the information pushing table, corresponding information to be pushed to a playing terminal corresponding to an identifier of a playing terminal in the information pushing table. Please refer to the embodiment of the foregoing step S33 for details.

Further, the second transceiver module 31 of the information server 30 is further configured to receive the playing terminal group information record table from the program server 10.

The second transceiver module 31 of the information server 30 may receive the playing terminal group information record table from the program server 10 by using the Internet, or may receive the playing terminal group information record table from the program server 10 in another wireless communication manner.

The program server 10 sends the program information to a playing terminal, acquires an identifier of the playing terminal returned by the playing terminal, marks playing terminals that can play same program content into one playing terminal group, and generates the playing terminal group information record table. The program information includes a program number and the program content.

Figure 8:
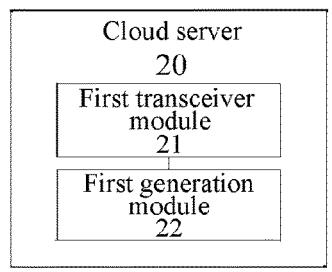
FIG. 8 is a schematic structural diagram of a preferred embodiment of a cloud server according to the present invention.

Referring to FIG. 8, a specific structure of the cloud server 20 is the same as that of the cloud server 20 in the foregoing information pushing system.

Figure 9:
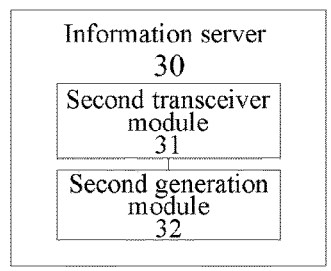
FIG. 9 is a schematic structural diagram of a preferred embodiment of an information server of the present invention.

Referring to FIG. 9, a specific structure of the information server 30 is the same as that of the information server 30 in the foregoing information pushing system.

Furthermore, it is apparent to those having ordinary skill in the art that this disclosure also provides an information pushing system that includes a program server, a cloud server and a playing terminal separately connected to the program server, and an information server connected to the cloud server. The cloud server and the information server each include a non-transitory program storage medium and one or more processors. The non-transitory program storage medium stores program code executable by the one or more processors to perform the methods as described above. Furthermore, it is apparent to those having ordinary skill in the art that various units or modules 21, 22, 31, and 32 as illustrated in FIGS. 7-9, can be software modules or software units. In another aspect, it is well-known that various software modules or software units inherently can be stored in the non-transitory program storage medium and executed by the one or more processors.

The above are merely preferred embodiments of the present invention, and the patent scope of the present invention is not limited thereto. Any equivalent structural variation or equivalent procedure variation made by using the content of the specification and the accompanying drawings of the present invention, or direct or indirect application in other related technical fields similarly fall within in the patent protection scope of the present invention.

What is claimed is:

1. An information pushing method, the method comprising:
a cloud server receiving program information from a program server and analyzing program content in the received program information to find available regions in image frames of the program content;
the cloud server generating a block information record table for the found available regions, the block information record table comprising program numbers, identifiers of the available regions, locations and shapes of the available regions, and durations of identical available regions in the program content; and
an information server receiving the block information record table from the cloud server, finding corresponding information to be pushed for the identifiers of the available regions in the block information record table according to a preset information association rule, associating the information to be pushed with the identifiers and sending the found information to be pushed to a corresponding playing terminal, so as to insert, in the available regions in the image frames of the program content played by the playing terminal, the corresponding information to be pushed, comprising:
the information server receiving the block information record table from the cloud server, finding the corresponding information to be pushed for the available regions corresponding to the identifiers of the available regions in the block information record table according to the preset information association rule, and associating the information to be pushed with the identifiers, to generate a temporary record table, the temporary record table comprising the program numbers, the identifiers of the available regions, the locations and shapes of the available regions, the durations of the identical available regions in the program content, and the corresponding information to be pushed for the identifiers of the available regions;
the information server performing mapping on the temporary record table and a playing terminal group information record table by using the program numbers, respectively, so as to generate an information pushing table, the playing terminal group information record table comprising a program number, an identifier of a playing terminal group, and an identifier of at least one playing terminal, wherein the program number, the identifier of the playing terminal group, and the identifier of the at least one playing terminal are corresponding to each other; and
the information server pushing, according to the information pushing table, corresponding information to be pushed to a playing terminal corresponding to an identifier of a playing terminal in the information pushing table, so as to insert, in the available regions in the image frames of the program content played by the corresponding playing terminal, the corresponding information to be pushed.

2. The method according to claim 1, wherein after the step of if the size of the initial block is greater than the first preset value, performing regularization processing on a shape of the initial block, the method further comprises: determining whether a size of the initial block after regularization processing is greater than a second preset value; and if the size of the initial block after regularization processing is greater than the second preset value, determining the initial block after regularization processing as the available region in the corresponding image frames of the program content.

3. The method according to claim 1, wherein before the step of an information server receiving the block information record table from the cloud server, finding corresponding information to be pushed for the identifiers of the available regions in the block information record table according to a preset information association rule, associating the information to be pushed with the identifiers and sending the found information to be pushed to a corresponding playing terminal, so as to insert, in the available regions in the image frames of the program content played by the playing terminal, the corresponding information to be pushed, the method further comprises:
the information server receiving the playing terminal group information record table from the program server.

4. The information pushing method according to claim 1, wherein the cloud server comprises: a first transceiver module, configured to receive program information from a program server; and a first generation module, configured to analyze program content in the received program information to find available regions in image frames of the program content, and generate a block information record table for the found available regions, the block information record table comprising program numbers, identifiers of the available regions, locations and shapes of the available regions, and durations of identical available regions in the program content.

5. The method according to claim 1, wherein the regularization processing comprises: when the shape of the initial block is irregular, the shape of the initial block is processed into an optimal regular shape according to an original shape of the initial block.

6. The method according to claim 1, wherein the step of the cloud server receiving program information from the program server and analyzing program content in the received program information to find available regions in image frames of the program content comprises: the cloud server receiving the program information from the program server, analyzing the image frames of the program content in the program information, finding a region, having fixed content or having a periodic changing rule, in the image frames, and using the region as an initial block; analyzing a degree of influence of the initial block on a display effect of playing of the program content; if the degree of the influence of the initial block on the display effect of playing of the program content is no influence or slight influence, determining whether a size of the initial block is greater than a first preset value; if the size of the initial block is greater than the first preset value, performing regularization processing on a shape of the initial block; and determining the initial block after regularization processing as an available region in the corresponding image frames of the program content.

7. The information pushing method according to claim 4, wherein the information server comprises: a second transceiver module, configured to receive a block information record table from a cloud server; and a second generation module, configured to find corresponding information to be pushed for identifiers of available regions in the block information record table according to a preset information association rule, and associate the information to be pushed with the identifiers; and the second transceiver module is further configured to send the found information to be pushed to a corresponding playing terminal, so as to insert, in the available regions in image frames of the program content played by the playing terminal, the corresponding information to be pushed.

8. An information pushing system, wherein the system comprises: a program server, a cloud server and a playing terminal separately connected to the program server and an information server connected to the cloud server, the information server being connected to the playing terminal, wherein the cloud server comprises a processor and a non-transitory memory coupled to the processor, the non-transitory memory storing a first transceiver module and a first generation module executable by the processor:

the first transceiver module, configured to receive program information from the program server; and the first generation module, configured to analyze program content in the received program information to find available regions in image frames of the program content, and generate a block information record table for the found available regions, the block information record table comprising program numbers, identifiers of the available regions, locations and shapes of the available regions, and durations of identical available regions in the program content; and the information server comprises a processor and a non-transitory memory coupled to the processor, the non-transitory memory storing a second transceiver module and a second generation module executable by the processor:

the second transceiver module, configured to receive the block information record table from the cloud server; and the second generation module, configured to find corresponding information to be pushed for the identifiers of the available regions in the block information record table according to a preset information association rule, and associate the information to be pushed with the identifiers, wherein the second transceiver module is further configured to send the found information to be pushed to a corresponding playing terminal, so as to insert, in the available regions in the image frames of the program content played by the playing terminal, the corresponding information to be pushed;

wherein the second generation module is configured to find the corresponding information to be pushed for the available regions corresponding to the identifiers of the available regions in the block information record table according to the preset information association rule, and associate the information to be pushed with the identifiers, so as to generate a temporary record table, the temporary record table comprising the program numbers, the identifiers of the available regions, the locations and shapes of the available regions, the durations of the identical available regions in the program content, and the corresponding information to be pushed for the identifiers of the available regions; and configured to perform mapping on the temporary record table and a playing terminal group information record table by using the program numbers, generate an information pushing table, the playing terminal group information record table comprising a program number, an identifier of a playing terminal group, and an identifier of at least one playing terminal, wherein the program number, the identifier of the playing terminal group, and the identifier of the at least one playing terminal are corresponding to each other.

9. The system according to claim 8, wherein the second transceiver module is further configured to push, according to the information pushing table, corresponding information to be pushed to a playing terminal corresponding to an identifier of a playing terminal in the information pushing table, so as to insert, in the available regions in the image frames of the program content played by the corresponding playing terminal, the corresponding information to be pushed.

10. The system according to claim 8, wherein the first generation module is further configured to determine whether a size of the initial block after regularization processing is greater than a second preset value; and configured to: if the size of the initial block after regularization processing is greater than the second preset value, determine the initial block after regularization processing as an available region in the corresponding image frames of the program content.

11. The system according to claim 8, wherein the second transceiver module is further configured to receive a playing terminal group information record table from the program server.

12. The system according to claim 8, wherein the regularization processing comprises: when the shape of the initial block is irregular, the shape of the initial block is processed into an optimal regular shape according to an original shape of the initial block.

13. The system according to claim 8, wherein the first generation module comprises: a first analysis unit, configured to analyze the image frames of the program content in the program information, find a region, having fixed content or having a periodic changing rule, in the image frames, and use the region as an initial block; a second analysis unit, configured to analyze a degree of influence of the initial block on a display effect of playing of the program content; a first judging unit, configured to: when the degree of the influence of the initial block on the display effect of playing of the program content is no influence or slight influence, determine whether a size of the initial block is greater than a first preset value; and a regularization processing unit, configured to: when the size of the initial block is greater than the first preset value, perform regularization processing on a shape of the initial block.

14. The system according to claim 10, wherein the first generation module is further configured to generate the block information record table according to the available regions, the block information record table comprising the program numbers, the identifiers of the available regions, the locations and shapes of the available regions, and the durations of the identical available regions in the program content.

* * * * *